United States Patent
Shida et al.

(10) Patent No.: US 11,038,836 B2
(45) Date of Patent: Jun. 15, 2021

(54) COMPUTER SERVER AND METHOD OF OBTAINING INFORMATION ON NETWORK CONNECTION OF COMPUTER SERVER

(71) Applicant: FUJITSU LIMITED, Kawasaki (JP)

(72) Inventors: Kazuya Shida, Yokohama (JP); Seishiro Hamanaka, Yokohama (JP); Koji Sugai, Yokohama (JP); Kaname Takaochi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 15/910,186

(22) Filed: Mar. 2, 2018

(65) Prior Publication Data
US 2018/0270191 A1  Sep. 20, 2018

(30) Foreign Application Priority Data
Mar. 17, 2017  (JP) .............................. JP2017-053700

(51) Int. Cl.
*H04L 29/12* (2006.01)
*H04L 29/08* (2006.01)
*H04L 29/06* (2006.01)

(52) U.S. Cl.
CPC ........ *H04L 61/2007* (2013.01); *H04L 61/103* (2013.01); *H04L 67/141* (2013.01); *H04L 61/6022* (2013.01); *H04L 67/42* (2013.01)

(58) Field of Classification Search
CPC ... H04L 61/2007; H04L 67/42; H04L 67/141; H04L 61/103; H04L 61/6022; H04L 29/12; H04L 29/06; H04L 29/09

USPC ............ 709/245; 340/16.1; 370/475; 710/3; 711/200
See application file for complete search history.

(56) References Cited

U.S. PATENT DOCUMENTS

| | | | | |
|---|---|---|---|---|
| 2003/0200321 | A1* | 10/2003 | Chen ....................... | H04L 63/08 709/229 |
| 2005/0086332 | A1* | 4/2005 | Nakazawa ........ | H04L 29/12216 709/223 |
| 2006/0198390 | A1* | 9/2006 | Shouno ............... | H04L 61/2535 370/466 |

(Continued)

FOREIGN PATENT DOCUMENTS

| | | |
|---|---|---|
| JP | 2001-217832 | 8/2001 |
| JP | 2004-048649 | 2/2004 |

*Primary Examiner* — Tonia L Dollinger
*Assistant Examiner* — Mehulkumar J Shah
(74) *Attorney, Agent, or Firm* — Fujitsu Patent Center (57) ABSTRACT

A first computer server included in a cluster system includes a plurality of network interfaces, a memory, and a processor coupled to the memory. The processor retrieves a first Internet Protocol (IP) address and a second IP address from the memory. The processor initiates a first communication process with a second computer server included in the cluster system via a first network interface of the plurality of network interfaces. The processor sets the first IP address to the first network interface when the first communication process enables communication with the second computer server. The processor initiates, using the first IP address, a second communication process with a first device having the second IP address via the first network interface. The processor obtains a type of the first device and outputs information on the type of the first device in association with information on the first network interface.

12 Claims, 4 Drawing Sheets

(56) References Cited

U.S. PATENT DOCUMENTS

| | | | |
|---|---|---|---|
| 2012/0259988 A1* | 10/2012 | Erringer | H04L 67/148 |
| | | | 709/228 |
| 2016/0100008 A1* | 4/2016 | Accetta | H04L 67/1097 |
| | | | 709/217 |
| 2018/0270109 A1* | 9/2018 | Hollis | H04L 41/0803 |

* cited by examiner

COMPUTER SERVER AND METHOD OF OBTAINING INFORMATION ON NETWORK CONNECTION OF COMPUTER SERVER

CROSS-REFERENCE TO RELATED APPLICATION

This application is based upon and claims the benefit of priority of the prior Japanese Patent Application No. 2017-053700, filed on Mar. 17, 2017, the entire contents of which are incorporated herein by reference.

FIELD

The embodiments discussed herein are related to a computer server, a method of obtaining information on a network connection of a computer server, and a non-transitory computer-readable recording medium having stored therein a program.

BACKGROUND

In a cluster system, there is a plurality of networks including an admin local area network (LAN), a cluster interconnect, and a public LAN. When there is a plurality of networks, network settings are performed for each of the networks. Therefore, it becomes complicated to perform the network settings, and a wrong interface may be selected when selecting a network interface to be used for each of the networks. Simplification of the network settings is desired in such a system with a plurality of networks.

For example, network settings in a cluster system are performed in the following procedure when the network settings are performed manually. At first, an operator estimates whether each of a plurality of network interfaces connected to a server is for an admin LAN, a cluster interconnect, or a public LAN. Thereafter, the operator performs network settings such as Internet Protocol (IP) address settings of the individual interfaces based on the estimated information.

The interface numbers of the network interfaces are in the order recognized by an operating system (OS). Therefore, the number expected by the operator for a certain network interface may be different from the actual interface number. It is also conceivable in a cluster system that, when the order recognized by the OS is different among servers configuring the cluster, a different interface number may be assigned to a network interface configuring a particular network. In such a state, if the operator does not recognize that the interface number is different and performs network settings for a wrong network interface, the operator may fail in constructing the cluster system.

To avoid such setting mistakes, among a plurality of network interfaces mounted on a server, network interfaces that can perform communication between servers configuring the cluster may be displayed. This technology is realized by transmission of a response request message from cluster software installed in each server and reception of a response message transmitted by cluster software in another server in response to the response request message.

Other technologies of the related art regarding network settings include technology for allowing an operator to perform settings by displaying network settings of each of devices connected via a network. In this technology, a computer obtains network settings of each device by comparing responses to Address Resolution Protocol (ARP) and Simple Network Management Protocol (SNMP) transmit by broadcasting. Accordingly, the computer determines whether there is an IP address of each device, and obtains the values such as Media Access Control (MAC) address value and IP address value.

Further technologies of the related art regarding network settings include technology for automatically recognizing a network configuration and displaying a logical network configuration. In this technology, a computer recognizes the active state of each network device using Internal Control Message Protocol (ICMP), and detects the type of network device through communication using SNMP. Accordingly, the computer associates the MAC address and IP address of each device, and identifies the type of each device.

Such technologies are described in Japanese Laid-open Patent Publication No. 2004-048649 and Japanese Laid-open Patent Publication No. 2001-217832.

However, even when network interfaces that can perform communication between servers configuring the cluster are displayed, it is difficult to identify whether each network interface is to be used for an admin LAN, a cluster interconnect, or a public LAN. Therefore, this method has difficulty in alleviating the complexity of network settings.

The technology of the related art for displaying network settings of the individual devices connected via a network is subject to the condition that the network setting such as the IP address setting of each computer is completed. The same applies to the technology of the related art for automatically recognizing a network configuration and displaying a logical network configuration. Because it is difficult to perform communication when the network settings of each computer are not done, it is difficult to alleviate the complexity of network settings even with the above-described technologies of the related art.

SUMMARY

According to an aspect of the present invention, provided is a first computer server included in a cluster system. The first computer server includes a plurality of network interfaces, a memory, and a processor coupled to the memory. The processor is configured to retrieve a first Internet Protocol (IP) address and a second IP address from the memory. The processor is configured to initiate a first communication process with a second computer server included in the cluster system via a first network interface of the plurality of network interfaces. The processor is configured to set the first IP address to the first network interface when the first communication process enables communication with the second computer server. The processor is configured to initiate, using the first IP address, a second communication process with a first device having the second IP address via the first network interface. The processor is configured to obtain a type of the first device when the second communication process enables communication with the first device. The processor is configured to output information on the type of the first device in association with information on the first network interface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of a computer server, a method of obtaining information on a network connection of a computer server, and a non-transitory computer-readable recording medium having stored therein a program disclosed by the present application will be described in detail based on the drawings. Note that the computer server, the method of obtaining information on a network connection of the computer server, and the non-transitory computer-readable recording medium having stored therein a program disclosed by the present application are not limited by the following embodiments.

First Embodiment

Figure 1:
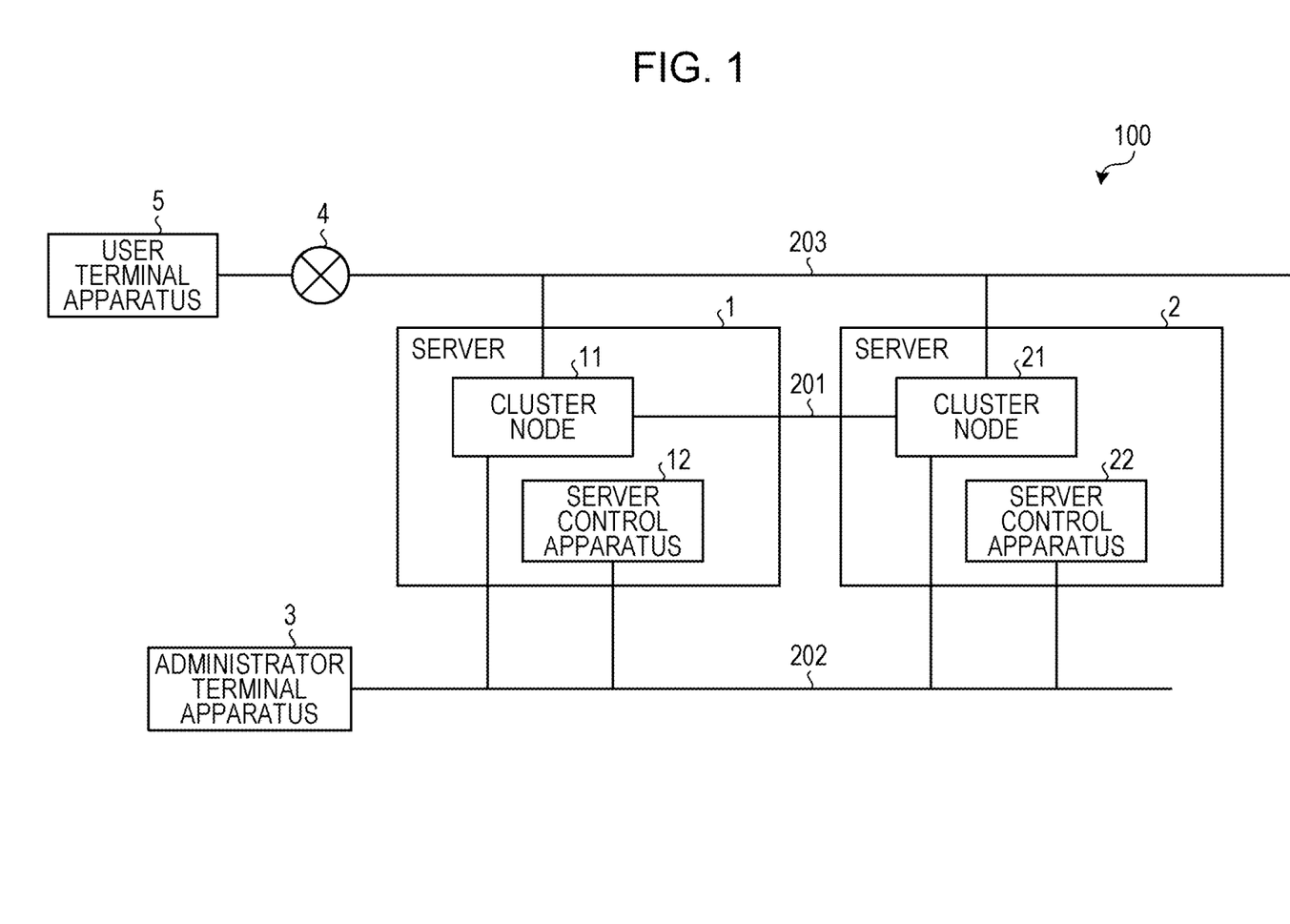
FIG. 1 is a configuration diagram of a cluster system.

FIG. 1 is a configuration diagram of a cluster system. A cluster system 100 according to a first embodiment includes redundant servers 1 and 2.

The server 1 includes a cluster node 11 and a server control apparatus 12. The server 2 includes a cluster node 21 and a server control apparatus 22.

The cluster nodes 11 and 21 operate on an operating system (OS). The cluster node 11 and the cluster node 21 communicate with each other via an interconnect 201, which directly connects the server 1 and the server 2. For example, the cluster node 11 and the cluster node 21 notify each other of the operating conditions via the interconnect 201 and checks whether the other is operating normally.

The cluster nodes 11 and 21 are connected to the server control apparatuses 12 and 22, respectively, via an admin LAN 202. The admin LAN 202 is a network for, for example, turning off the power of the cluster nodes 11 and 21. The cluster functions of the cluster nodes 11 and 21 are set in response to inputs from the server control apparatuses 12 and 22, respectively. Various settings such as network settings of the cluster nodes 11 and 21 can be performed using, for example, input devices provided with the servers 1 and 2.

Furthermore, the cluster nodes 11 and 21 are connected to a router 4 via a public LAN 203. The router 4 is further connected to a user terminal apparatus 5. That is, the cluster nodes 11 and 21 are connected to the user terminal apparatus 5 via the public LAN 203 and the router 4. The public LAN 203 is a network for the cluster nodes 11 and 21 to provide services to an operator who operates the user terminal apparatus 5.

The server control apparatuses 12 and 22 are, for example, extended boards mounted on the servers 1 and 2, respectively. The server control apparatuses 12 and 22 operate independent of, for example, the OS. The server control apparatuses 12 and 22 are connected to the cluster nodes 11 and 21 and an administrator terminal apparatus 3 via the admin LAN 202. Various settings such as network settings of the server control apparatuses 12 and 22 can be performed using, for example, input devices provided with the servers 1 and 2.

Although various settings of the cluster nodes 11 and 21 and the server control apparatuses 12 and 22 may be performed in response to inputs from the administrator terminal apparatus 3, the cluster nodes 11 and 21 and the server control apparatuses 12 and 22 may be set in response to inputs other than those from the above-described administrator terminal apparatus 3. In particular, when network settings of a network interface to be used for the admin LAN 202 are not completed, it is difficult for the cluster nodes 11 and 21 and the server control apparatuses 12 and 22 to receive inputs from the administrator terminal apparatus 3. In such a case, the cluster nodes 11 and 21 and the server control apparatuses 12 and 22 are set using input devices provided with the servers 1 and 2 or the like.

The server control apparatuses 12 and 22 monitor the state of the servers 1 and 2, respectively. For example, when the cluster node 11 detects a hang of the cluster node 21 via the interconnect 201, the server control apparatus 22 receives a command to shut down the server 2 from the cluster node 11 via the admin LAN 202. The server control apparatus 22 turns off the power of the cluster node 21.

The router 4 is a communication device for connecting to an external network. The administrator terminal apparatus 3 is a terminal apparatus for managing the cluster nodes 11 and 21 and the server control apparatuses 12 and 22. The user terminal apparatus 5 is connected to the public LAN 203 via the router 4. The user terminal apparatus 5 receives services provided from the cluster nodes 11 and 21.

The server 1 and the server 2 have the same functions in the cluster system 100. Hereinafter, the server 1 will be described by way of example.

Figure 2:
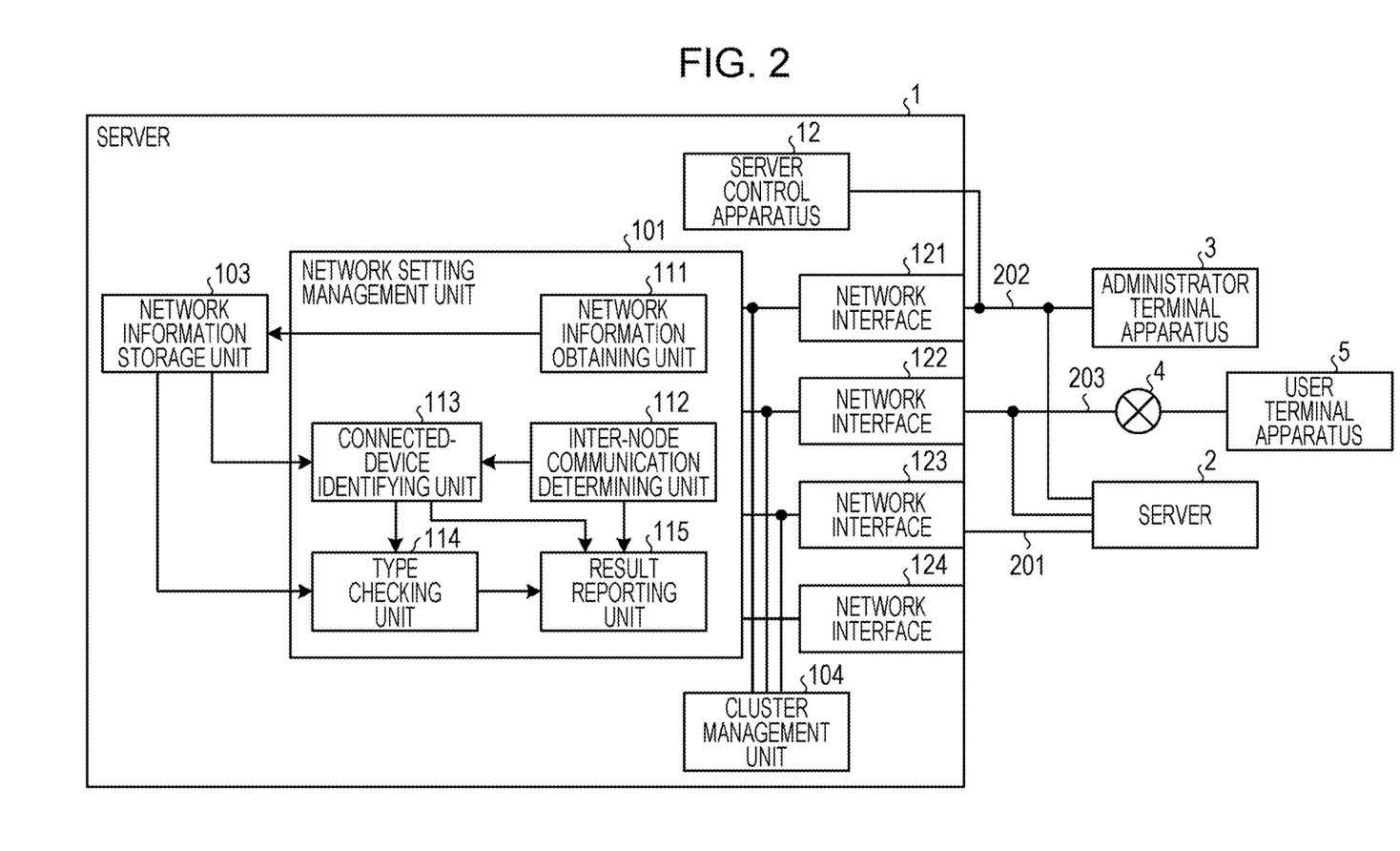
FIG. 2 is a block diagram of a server according to an embodiment.

FIG. 2 is a block diagram of a server according to the present embodiment. The server 1 includes network interfaces 121 to 124, in addition to the server control apparatus 12 illustrated in FIG. 1. Although the case where the server 1 includes four network interfaces 121 to 124 in the present embodiment is described here by way of example, the number of network interfaces is not particularly limited. Although the network interfaces 121 to 124 used by a network setting management unit 101 and a connection path of the server control apparatus 12 are separated in the present embodiment, the server control apparatus 12 may connect to the admin LAN 202 via any of the network interfaces 121 to 124. Hereinafter, the network interfaces 121 to 124 will be referred to as "network interfaces 120" when no distinction is made among the network interfaces 121 to 124. Furthermore, the server 1 includes the network setting management unit 101, a network information storage unit 103, and a cluster management unit 104.

The cluster management unit 104 has the function of the cluster node 11 in FIG. 1. The cluster management unit 104 is connected to each of the network interfaces 121 to 123.

The network interface 121 is connected to the admin LAN 202. The network interface 121 is connected to the server 2, the administrator terminal apparatus 3, and the server control apparatus 12 via the admin LAN 202.

The network interface 122 is connected to the public LAN 203. The network interface 122 is connected to the server 2 via the public LAN 203. In addition, the network interface 122 is connected to the user terminal apparatus 5 via the public LAN 203 and the router 4.

The network interface 123 is connected to the interconnect 201. The network interface 123 is connected to the server 2 via the interconnect 201.

When network settings such as IP address settings of the network interfaces 121 to 124 are not performed by an operator, none of the network interfaces 121 to 124 has network settings such as the IP address. Although a process performed by the network setting management unit 101 of notifying the operator of the connection state of the network interfaces 120 when performing network settings will be described below, the network settings of some or all of the network interfaces 120 have not been performed yet in that case.

The network setting management unit 101 notifies the operator of the connection state of each of the network interfaces 121 to 124 for the operator to perform the network settings of the network interfaces 121 to 124. The network setting management unit 101 includes a network information obtaining unit 111, an inter-node communication determining unit 112, a connected-device identifying unit 113, a type checking unit 114, and a result reporting unit 115. For the sake of clarity, it is illustrated in FIG. 2 that the network interfaces 121 to 124 are connected to the network setting management unit 101. However, the network information obtaining unit 111 can access the network interface 121. In addition, the inter-node communication determining unit 112, the connected-device identifying unit 113, and the type checking unit 114 can access the network interfaces 121 to 124.

The network information obtaining unit 111 obtains network information, input by the operator using the administrator terminal apparatus 3 or an input device provided with the server 1, via the network interface 121. The network information includes the IP address of the router 4 and the IP address of the server control apparatus 12. Furthermore, the network information includes an IP address to be set to each of the network interfaces 120 of the server 1 that connect to the admin LAN 202 and an IP address to be set to each of the network interfaces 120 of the server 1 that connect to the public LAN 203. The network information obtaining unit 111 stores the obtained network information in the network information storage unit 103.

The inter-node communication determining unit 112 receives a notification request for the connection state of each of the network interfaces 120 from the administrator terminal apparatus 3 via the network interface 121 or from the input device provided with the server 1. The inter-node communication determining unit 112 determines whether communication with the server 2 via each of the network interfaces 121 to 124 is possible. Here, the fact that communication with the server 2 is possible means that the cluster node 11 and the cluster node 21 in FIG. 1 can communicate with each other. Hereinafter, the fact that communication with the server 2 is possible may be described as the fact that "inter-node communication is possible". Here, the inter-node communication determining unit 112 determines whether inter-node communication is possible using a unique protocol. That is, the inter-node communication determining unit 112 can determine whether inter-node communication is possible without using an IP address. An information processing apparatus that can perform this inter-node communication, that is, the server 2 for the server 1, corresponds to an example of a "certain information processing apparatus".

That is, in the cluster system 100, connection is established with the server 2 using any of networks including the interconnect 201, the admin LAN 202, and the public LAN 203. That is, it is considered that the network interface 120 that is not connected to the server 2 is not used in the cluster system 100. Therefore, the inter-node communication determining unit 112 determines not to use the network interface 120 that does not perform inter-node communication since that particular network interface 120 is not connected to the server 2.

The inter-node communication determining unit 112 notifies the connected-device identifying unit 113 of information on the network interface 120 that is connected to the server 2 and that can perform inter-node communication. The network interface 120 that is connected to the server 2 and that can perform inter-node communication corresponds to a "first network interface". Here, the inter-node communication determining unit 112 notifies the connected-device identifying unit 113 of information on the network interfaces 121 to 123. In addition, the inter-node communication determining unit 112 notifies the result reporting unit 115 of information on the network interface 120 that does not perform inter-node communication. The inter-node communication determining unit 112 corresponds to an example of an "extracting unit".

The connected-device identifying unit 113 obtains information on the network interface 120 that can perform inter-node communication from the inter-node communication determining unit 112. Next, the connected-device identifying unit 113 obtains the IP address of the router 4 and the IP address of the server control apparatus 12 from the network information storage unit 103. The router 4 and the server control apparatus 12 correspond to an example of a "connected device".

Next, the connected-device identifying unit 113 determines whether communication is possible with a device that has an IP address specified as the IP address of the router 4 based on the Address Resolution Protocol (ARP) using each of the network interfaces 120 that can perform inter-node communication. In addition, the connected-device identifying unit 113 determines whether communication is possible with a device that has an IP address specified as the IP address of the server control apparatus 12 based on ARP using each of the network interfaces 120 that can perform inter-node communication. Accordingly, the connected-device identifying unit 113 identifies the network interface 120 connected to a device that has an IP address specified as the IP address of the router 4. In addition, the connected-device identifying unit 113 identifies the network interface 120 connected to a device that has an IP address specified as the IP address of the server control apparatus 12. Although the connected-device identifying unit 113 executes checking of the connection with a device that has each IP address using ARP here in the present embodiment, the connected-device identifying unit 113 may use any other communication method as long as that method enables communication without using an IP address. For example, the connected-device identifying unit 113 may check the connection using the layer (L) 2 communication method of the Open Systems Interconnection (OSI) reference model, instead of using ARP.

Here, the case where the IP address of the router 4 and the IP address of the server control apparatus 12, which are input by the operator, are correct will be described. In that case, the connected-device identifying unit 113 identifies the network interface 121 as the network interface 120 to be connected to the server control apparatus 12. In addition, the connected-device identifying unit 113 identifies the network interface 122 as the network interface 120 to be connected to the router 4. The network interface 121 or 122 connected to the server control apparatus 12 or the router 4, respectively, corresponds to an example of a "second network interface".

The connected-device identifying unit 113 outputs information on the network interface 120 connected to the server control apparatus 12 or the router 4 to the type checking unit 114 along with information on a connected device that is connected to the network interface 120. Here, the connected-device identifying unit 113 outputs information on the network interface 121 connected to the server control apparatus 12 and information on the network interface 122 connected to the router 4 to the type checking unit 114.

Furthermore, the connected-device identifying unit 113 outputs information on the network interface 120 that can perform inter-node communication and that is neither connected to the server control apparatus 12 or the router 4 to the result reporting unit 115. Here, the connected-device identifying unit 113 outputs information on the network interface 123 to the result reporting unit 115. The connected-device identifying unit 113 corresponds to an example of an "identifying unit".

The type checking unit 114 receives an input of information on the network interface 120 connected to the server control apparatus 12 or the router 4 from the connected-device identifying unit 113. At this time, the type checking unit 114 additionally receives an input of information on a connected device connected to each of the network interfaces 120 from the connected-device identifying unit 113.

Next, the type checking unit 114 obtains information on an IP address to be set to the network interface 120 that connects to the admin LAN 202 from the network information storage unit 103. Furthermore, the type checking unit 114 obtains information on an IP address to be set to the network interface 120 that connects to the public LAN 203 from the network information storage unit 103.

Furthermore, the type checking unit 114 determines, from information on a connected device of each of the network interfaces 120 whose information has been obtained, to which of the admin LAN 202 and the public LAN 203 each network interface 120 is to be connected. Here, the type checking unit 114 determines that the network interface 121 is to be connected to the admin LAN 202, and the network interface 122 is to be connected to the public LAN 203.

Next, the type checking unit 114 temporarily sets an IP address to be set to the network interface 120 that connects to the admin LAN 202, among the network interfaces 120 connected to the server control apparatus 12. Here, the type checking unit 114 temporarily sets, to the network interface 121, an IP address to be set to the network interface 121 that connects to the admin LAN 202. The type checking unit 114 performs communication using SNMP, which is L3 communication, with a device that has an IP address specified as the IP address of the server control apparatus 12 via the network interface 121, and obtains information on the type of device connected to the network interface 121. In this case, the type checking unit 114 obtains information on the server control apparatus 12 as the type of device connected to the network interface 121.

Next, the type checking unit 114 temporarily sets an IP address to be set to the network interface 120 that connects to the public LAN 203, among the network interfaces 120 connected to the server control apparatus 12. Here, the type checking unit 114 temporarily sets, to the network interface 122, an IP address to be set to the network interface 122 that connects to the public LAN 203. The type checking unit 114 performs communication using SNMP with a device that has an IP address specified as the IP address of the router 4 via the network interface 122, and obtains information on the type of device connected to the network interface 122. In this case, the type checking unit 114 obtains information on the router 4 as the type of device connected to the network interface 122.

Thereafter, the type checking unit 114 outputs, to the result reporting unit 115, the type of device connected to the network interface 120 that can perform inter-node communication and that can communicate with an IP address specified as the IP address of the router 4 or the server control apparatus 12. Thereafter, the type checking unit 114 deletes the IP address that has been temporarily set to each of the network interfaces 120. The type checking unit 114 corresponds to an example of an "obtaining unit". The IP addresses temporarily set to the network interfaces 121 and 122 correspond to an example of a "temporary network address". The type of devices connected to the network interface 122 corresponds to an example of "information on a connected device capable of communicating".

The result reporting unit 115 receives an input of information on the network interface 120 that does not perform inter-node communication from the inter-node communication determining unit 112. In addition, the result reporting unit 115 receives, from the connected-device identifying unit 113, an input of information on the network interface 120 that can perform inter-node communication and that performs no communication with an IP address specified as the IP address of the router 4 or the server control apparatus 12. Furthermore, the result reporting unit 115 receives, from the type checking unit 114, an input of the type of device connected to the network interface 120 that can perform inter-node communication and that can communicate with an IP address specified as the IP address of the router 4 or the server control apparatus 12.

The result reporting unit 115 determines to which of the interconnect 201, the admin LAN 202, and the public LAN 203 each network interface 120 connects. Thereafter, the result reporting unit 115 notifies the operator of the determination result by, for example, displaying information on a to-be-connected network on a monitor.

Specifically, the result reporting unit 115 notifies the operator of the network interface 123, which can perform inter-node communication and which is neither connected to the router 4 or the server control apparatus 12, as an interface that connects to the interconnect 201. In addition, the result reporting unit 115 notifies the operator of the network interface 121, which can perform inter-node communication and which is connected to the server control apparatus 12, as an interface that connects to the admin LAN 202. In addition, the result reporting unit 115 notifies the operator of the network interface 122, which can perform inter-node communication and which is connected to the router 4, as an interface that connects to the public LAN 203. Furthermore, the result reporting unit 115 notifies the operator of the network interface 124, which does not perform inter-node communication, as other interfaces. Accordingly, the operator can check to which network each of the network interfaces 121 to 124 is connected.

Figure 3:
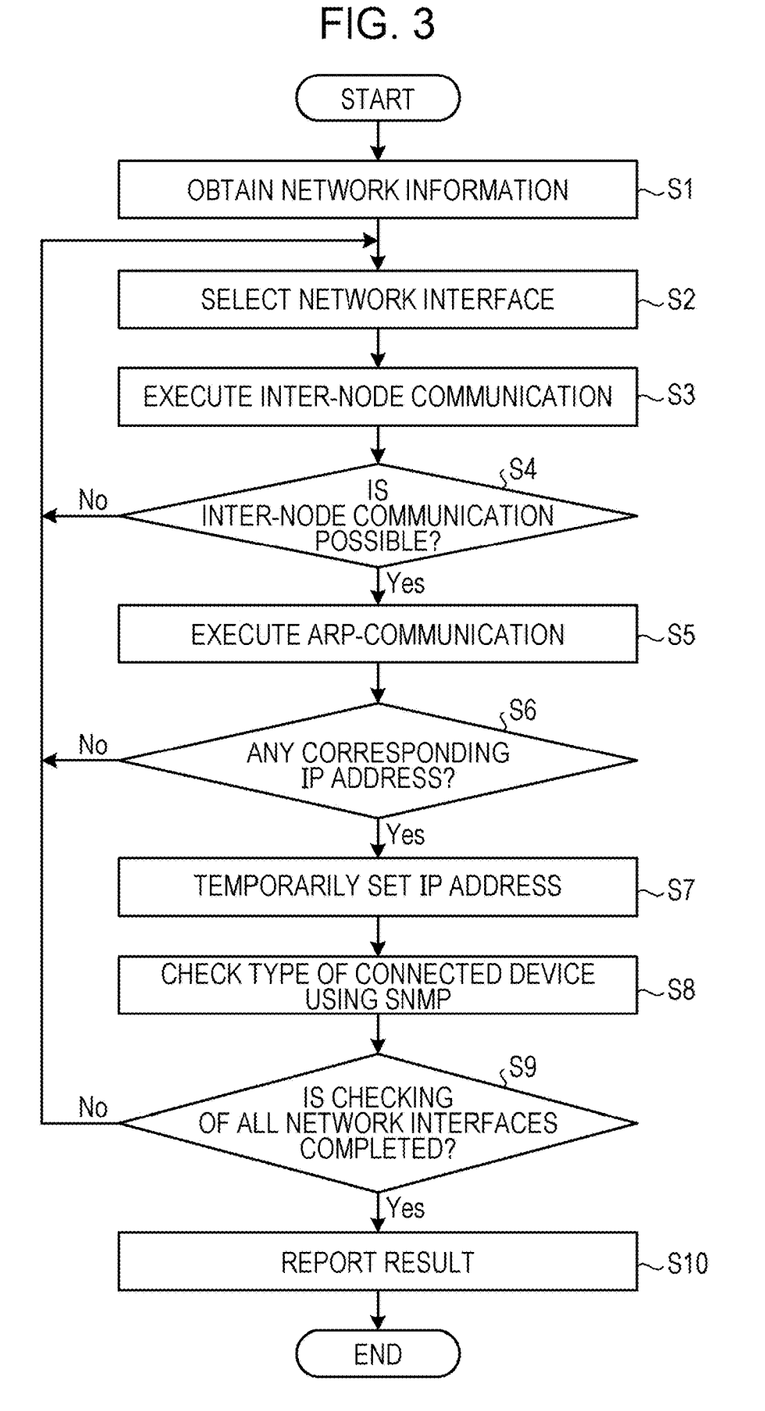
FIG. 3 is a flowchart of a process of checking the connection state of a network interface.

Referring next to FIG. 3, the flow of a process of checking the connection state of each of the network interfaces 120, performed by the cluster system 100 according to the present embodiment, will be described. FIG. 3 is a flowchart of a process of checking the connection state of a network interface.

The network information obtaining unit 111 obtains an input of network information from the administrator terminal apparatus 3 via the network interface 121 (step S1). The network information includes the IP address of the router 4 and the IP address of the server control apparatus 12. In addition, the network information includes an IP address to be set to each of the network interfaces 120 that connect to the admin LAN 202 and an IP address to be set to each of the network interfaces 120 that connect to the public LAN 203. The network information obtaining unit 111 stores the obtained network information in the network information storage unit 103.

The inter-node communication determining unit 112 selects one of the network interfaces 120 for which checking of the connection state is not completed, from among the network interfaces 121 to 124 (step S2).

Next, the inter-node communication determining unit 112 executes inter-node communication with the cluster node 21 of the server 2 using the selected network interface 120 (step S3).

The inter-node communication determining unit 112 determines whether inter-node communication with the cluster node 21 of the server 2 using the network interface 120 is possible (step S4). If inter-node communication is difficult (negative in step S4), the inter-node communication determining unit 112 notifies the result reporting unit 115 of information on the selected network interface 120, and returns to step S2.

In contrast, if inter-node communication is possible (affirmative in step S4), the inter-node communication determining unit 112 notifies the connected-device identifying unit 113 of information on the selected network interface 120. The connected-device identifying unit 113 receives an input of information on the network interface 120 whose connection state is being determined from the inter-node communication determining unit 112. The connected-device identifying unit 113 obtains the IP address of the router 4 and the IP address of the server 2 from the network information storage unit 103. The connected-device identifying unit 113 executes communication using ARP (step S5).

The connected-device identifying unit 113 determines whether there is an IP address that corresponds to the router 4 or the server control apparatus 12, among devices with which communication using ARP can be performed (step S6). If there is no corresponding IP address (negative in step S6), the connected-device identifying unit 113 notifies the result reporting unit 115 of information on the network interface 120 whose connection state is being determined. Thereafter, the process returns to step S2.

In contrast, if there is a corresponding IP address (affirmative in step S6), the connected-device identifying unit 113 notifies the type checking unit 114 of the IP address of the router 4 or the server control apparatus 12 with which communication can be performed by the network interface 120 whose connection state is being determined. The type checking unit 114 receives, from the connected-device identifying unit 113, an input of the IP address of the router 4 or the server control apparatus 12 with which communication can be performed by the network interface 120 whose connection state is being determined. Next, the type checking unit 114 determines to which of the admin LAN 202 and the public LAN 203 the network interface 120 whose connection state is being determined connects. Thereafter, the type checking unit 114 temporarily sets an IP address to be set to the network interface 120 that connects to the admin LAN 202 or the public LAN 203 in accordance with the network to which the network interface 120 connects (step S7).

Next, the type checking unit 114 performs SNMP-based communication with the obtained IP address using the network interface 120 whose connection state is being determined, and checks the type of a connected device (step S8). The type checking unit 114 outputs, to the result reporting unit 115, the type of a connected device to which the network interface 120 whose connection state is being determined connects. Thereafter, the type checking unit 114 deletes the IP address that has been temporarily set to the network interface 120 whose connection state is being determined.

The result reporting unit 115 receives, from the connected-device identifying unit 113, an input of the type of a connected device to which the network interface 120 whose connection state is being determined connects. Thereafter, the result reporting unit 115 determines whether checking of the connection state of all the network interfaces 120 mounted on the server 1 is completed (step S9).

If there remains a network interface 120 for which checking of the connection state is not completed (negative in step S9), the process returns to step S2.

In contrast, if checking of the connection state of all the network interfaces 120 of the server 1 is completed (affirmative in step S9), the result reporting unit 115 notifies the operator of the result of determining the network to which each of the network interfaces 120 connects (step S10).

As has been described above, the cluster system according to the present embodiment temporarily sets an IP address to each network interface, checks the connection state of each network interface, determines the network to which each network interface connects, and notifies the operator of the network to which each network interface connects. Accordingly, when performing network settings of the cluster system, the operator can easily check to which of the admin LAN, the public LAN, and the interconnect each network interface connects. That is, the operator can check the connection state in a state where no network settings are performed, thereby alleviating the complexity of network settings and reducing mistakes in settings.

Furthermore, in a cluster system, restrictions may be imposed on an interconnect as it is a network independent of other networks. In such a case, according to the cluster system according to the present embodiment, network interfaces that may be connected to the admin LAN and the public LAN may be excluded, thereby improving the accuracy of appropriate selection for the interconnect.

Second Embodiment

Next, a second embodiment will be described. A cluster system according to the second embodiment is different from the first embodiment in the point that whether there is a connected device connected to each network interface is determined after temporarily setting an IP address. The cluster system according to the second embodiment is also illustrated in FIGS. 1 and 2. In the following description, descriptions of the operation of portions that are the same as those in the first embodiment will be omitted.

The connected-device identifying unit 113 obtains information on the network interface 120 that can perform inter-node communication from the inter-node communication determining unit 112. Next, the connected-device identifying unit 113 obtains the IP address of the router 4 and the IP address of the server control apparatus 12 from the network information storage unit 103. Furthermore, the connected-device identifying unit 113 obtains information on an IP address to be set to the network interface 120 that connects to the admin LAN 202 from the network information storage unit 103. In addition, the connected-device identifying unit 113 obtains information on an IP address to be set to the network interface 120 that connects to the public LAN 203 from the network information storage unit 103.

Next, the connected-device identifying unit 113 selects one of the network interfaces 120 that can perform inter-node communication. The connected-device identifying unit 113 temporarily sets, to the selected network interface 120, an IP address to be set to the network interface 120 that connects to the admin LAN 202. Thereafter, the connected-device identifying unit 113 determines whether communication is possible with a device that has the IP address of the server control apparatus 12 using the selected network interface 120. Here, if communication is possible with a device that has the IP address of the server control apparatus 12, the connected-device identifying unit 113 ends identification of a connected device connected to the selected network interface 120. The connected-device identifying unit 113 notifies the type checking unit 114 of the fact that the selected network interface 120 can communicate with a device that has the IP address of the server control apparatus 12.

In contrast, if communication with a device that has the IP address of the server control apparatus 12 is difficult, the connected-device identifying unit 113 temporarily sets, to the selected network interface 120, an IP address to be set to the network interface 120 that connects to the public LAN 203. Thereafter, the connected-device identifying unit 113 determines whether communication is possible with a device that has the IP address of the router 4 using the selected network interface 120. If communication is possible with a device that has the IP address of the router 4, the connected-device identifying unit 113 notifies the type checking unit 114 of the fact that the selected network interface 120 can communicate with a device that has the IP address of the router 4.

In contrast, if no communication with a device that has the IP address of the router 4 is performed, the connected-device identifying unit 113 outputs information on the selected network interface 120 to the result reporting unit 115.

The type checking unit 114 receives an input of information on the network interface 120 that can communicate with the router 4 or the server control apparatus 12 from the connected-device identifying unit 113. By performing communication using SNMP, the type checking unit 114 obtains information on the type of a connected device connected to each network interface 120, and outputs the obtained information to the result reporting unit 115. In this case, the type checking unit 114 may use the IP address of each network interface 120 that has been temporarily set by the connected-device identifying unit 113 as it is. Alternatively, the type checking unit 114 may obtain an IP address corresponding to the admin LAN 202 or the public LAN 203 from the network information storage unit 103, and may set the IP address to a corresponding network interface 120.

As has been described above, the cluster system according to the present embodiment temporarily sets an IP address and determines whether communication is possible with the router or the server control apparatus. Even when an IP address is temporarily set before determining whether or not communication is possible with a specified device, a network to which each network interface connects can be determined. Therefore, the operator can check the connection state in a state where no network settings are performed, thereby alleviating the complexity of network settings and reducing mistakes in settings.

Modifications

Furthermore, although the type of a connected device is determined after determining whether or not communication is possible with an IP address assigned to the router 4 or the server control apparatus 12 in the above-described embodiments, these determinations may be collectively performed. That is, determination performed by the connected-device identifying unit 113 of whether or not communication is possible may be omitted, and the type of a connected device may be checked by performing SNMP-based communication using an IP address temporarily set by the type checking unit 114, thereby collectively performing determination of whether or not communication is possible and checking of the type of a connected device. Even with such a configuration, the network to which each network interface connects can be determined. Therefore, the operator can check the connection state in a state where no network settings are performed, thereby alleviating the complexity of network settings and reducing mistakes in settings.

Hardware Configuration

Figure 4:
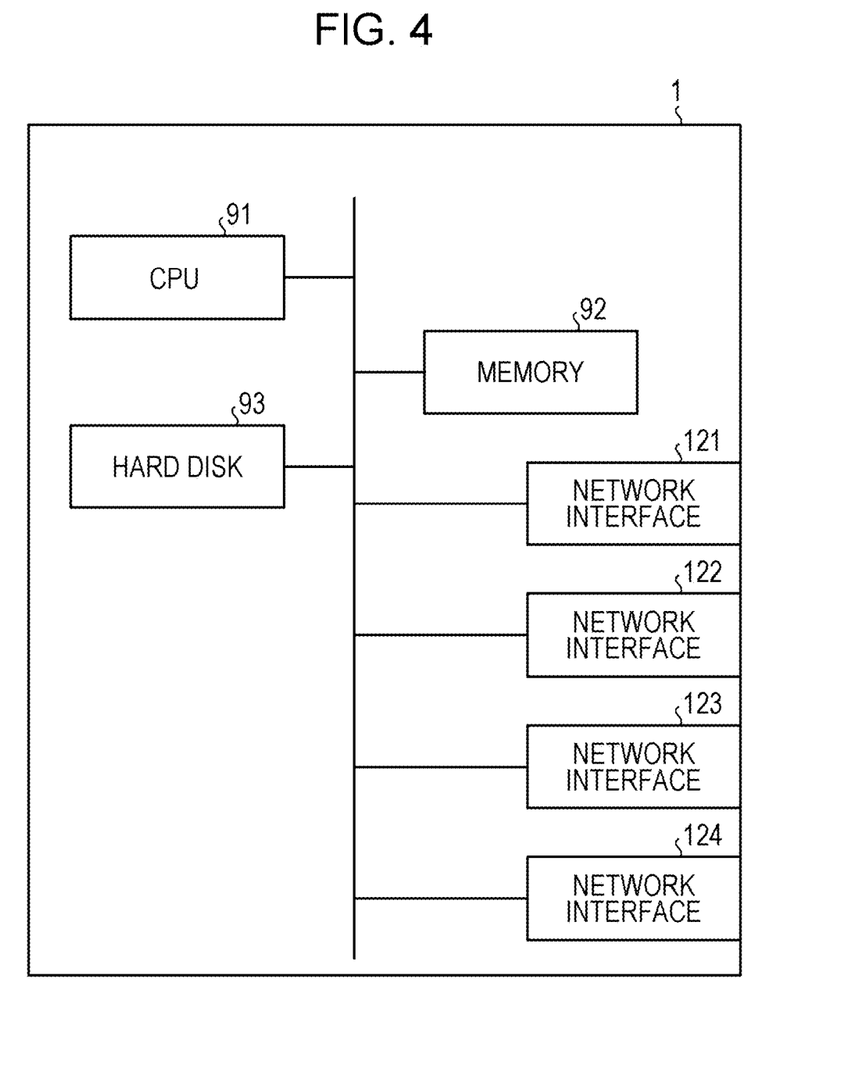
FIG. 4 is a hardware configuration diagram of the server.

FIG. 4 is a hardware configuration diagram of the server. Although the server 1 is illustrated by way of example in FIG. 4, for example, the server 2 has the same or similar configuration.

The server 1 includes a central processing unit (CPU) 91, memory 92, a hard disk 93, and the network interfaces 121 to 124. The CPU 91 is connected by bus to the memory 92, the hard disk 93, and the network interfaces 121 to 124.

The hard disk 93 realizes the function of the network information storage unit 103. Furthermore, the hard disk 93 stores various programs including a program for realizing the functions of the network setting management unit 101 and the cluster management unit 104 illustrated in FIG. 2.

The CPU 91 reads various programs including a program for realizing the functions of the network setting management unit 101 and the cluster management unit 104 from the hard disk 93, expands the programs on the memory 92, and executes the programs. Accordingly, the CPU 91 and the memory 92 realize the functions of the network setting management unit 101 and the cluster management unit 104. That is, the CPU 91 and the memory 92 realize the functions of the network information obtaining unit 111, the inter-node communication determining unit 112, the connected-device identifying unit 113, the type checking unit 114, and the result reporting unit 115 illustrated in FIG. 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of obtaining information on a network connection of a first computer server included in a cluster system, the method comprising:

retrieving, by the first computer server, a first Internet Protocol (IP) address and a second IP address from a memory, the first IP address and the second IP address are not set to any of a plurality of network interfaces included in the first computer server;

initiating a first communication process with a second computer server included in the cluster system via a first network interface of the plurality of network interfaces;

setting the first IP address to the first network interface when the first communication process enables communication with the second computer server;

initiating, using the first IP address as a temporary IP address with a first device, a second communication process with the first device having the second IP address via the first network interface;

obtaining a type of the first device when the second communication process enables communication with the first device with the temporary IP address, the type of the first device indicates a connection between the first network interface of the first computer server and the first device, the connection between the first network interface of the first computer server being one of an administrative Local Area Network (LAN), public LAN and interconnect with the second computer server; and outputting information on the type of the first device in association with information on the first network interface.

2. The method according to claim 1, further comprising:

initiating, before setting the first IP address to the first network interface, a third communication process via the first network interface without using the first IP address to determine whether the second communication process enables communication with the first device; and setting the first IP address to the first network interface upon determining that the second communication process enables communication with the first device.

3. The method according to claim 1, further comprising:

deleting, after obtaining the information on the type of the first device, the first IP address set to the first network interface.

4. The method according to claim 1, wherein the first device is one of communication devices, the method further comprising:

outputting information on the second computer server in association with information on the first network interface upon determining that the second communication process enables communication with none of the communication devices.

5. A first computer server included in a cluster system, the first computer server comprising:

a plurality of network interfaces;

a memory; and a processor coupled to the memory and the processor configured to:

retrieve a first Internet Protocol (IP) address and a second IP address from the memory, the first IP address and the second IP address are not set to any of the plurality of network interfaces included in the first computer server;

initiate a first communication process with a second computer server included in the cluster system via a first network interface of the plurality of network interfaces;

set the first IP address to the first network interface when the first communication process enables communication with the second computer server;

initiate, using the first IP address as a temporary IP address with a first device, a second communication process with the first device having the second IP address via the first network interface;

obtain a type of the first device when the second communication process enables communication with the first device with the temporary IP address, the type of the first device indicates a connection between the first network interface of the first computer server and the first device, the connection between the first network interface of the first computer server being one of an administrative Local Area Network (LAN), public LAN and interconnect with the second computer server; and output information on the type of the first device in association with information on the first network interface.

6. The first computer server according to claim 5, wherein the processor is further configured to:

initiate, before setting the first IP address to the first network interface, a third communication process via the first network interface without using the first IP address to determine whether the second communication process enables communication with the first device; and set the first IP address to the first network interface upon determining that the second communication process enables communication with the first device.

7. The first computer server according to claim 5, wherein the processor is further configured to:

delete, after obtaining the information on the type of the first device, the first IP address set to the first network interface.

8. The first computer server according to claim 5, wherein the first device is one of communication devices, and the processor is further configured to:

output information on the second computer server in association with information on the first network interface upon determining that the second communication process enables communication with none of the communication devices.

9. A non-transitory computer-readable recording medium having stored therein a program that causes a first computer server included in a cluster system to execute a process, the process comprising:

retrieving a first Internet Protocol (IP) address and a second IP address from a memory, the first IP address and the second IP address are not set to any of a plurality of network interfaces included in the first computer server;

initiating a first communication process with a second computer server included in the cluster system via a first network interface of a the plurality of network interfaces;

setting the first IP address to the first network interface when the first communication process enables communication with the second computer server;

initiating, using the first IP address as a temporary IP address with a first device, a second communication process with the first device having the second IP address via the first network interface;

obtaining a type of the first device when the second communication process enables communication with the first device with the temporary IP address, the type of the first device indicates a connection between the first network interface of the first computer server and the first device, the connection between the first network interface of the first computer server being one of an administrative Local Area Network (LAN), public LAN and interconnect with the second computer server; and outputting information on the type of the first device in association with information on the first network interface.

10. The non-transitory computer-readable recording medium according to claim 9, the process further comprising:

initiating, before setting the first IP address to the first network interface, a third communication process via the first network interface without using the first IP address to determine whether the second communication process enables communication with the first device; and setting the first IP address to the first network interface upon determining that the second communication process enables communication with the first device.

11. The non-transitory computer-readable recording medium according to claim 9, the process further comprising:

deleting, after obtaining the information on the type of the first device, the first IP address set to the first network interface.

12. The non-transitory computer-readable recording medium according to claim 9, wherein the first device is one of communication devices, the process further comprising:

outputting information on the second computer server in association with information on the first network interface upon determining that the second communication process enables communication with none of the communication devices.

\* \* \* \* \*